Aug. 1, 1961  D. H. McGOGY  2,994,548
SHAFT KEYING DEVICE
Filed April 3, 1958

DONALD H. McGOGY
INVENTOR.

BY
Fleht and Swain
ATTORNEYS

United States Patent Office 2,994,548
Patented Aug. 1, 1961

2,994,548
SHAFT KEYING DEVICE
Donald H. McGogy, 1713 Roosevelt Ave.,
Redwood City, Calif.
Filed Apr. 3, 1958, Ser. No. 726,106
14 Claims. (Cl. 287—52.05)

This invention relates generally to a shaft keying device and more particularly to a keying device for locking gears, pulleys, etc., to a shaft.

Many types of keys are employed for locking an element to a shaft. In general, a keyway is formed by recessing or grooving the shaft and element and bringing the recesses into registry. A key is then placed in the keyway. In order to prevent relative movement of the element and shaft, the recesses must be accurately machined whereby the recess formed in the shaft and the one formed in the element have the same width so that when the key is placed in the keyway there can be no relative movement between the shaft and element. Machining within the tolerances required is relatively time consuming, and consequently it is expensive to key an element to a shaft.

To overcome some of these difficulties, tapered keyways have been formed. A tapered key is then placed in the keyway and wedged in place. A key of this type is relatively difficult to install, particularly when the element is not at the end of the shaft and, furthermore, radial forces are developed. Again, machining must be relatively accurate or the width of one recess will differ from the width of the other, and relative movement of the parts will occur.

Rectangular two-piece keys with inclined abutting surfaces have also been employed. However, keys of this type suffer from the described disadvantages.

It is an object of the present invention to provide an improved shaft keying device.

It is another object of the present invention to provide a shaft keying device in which the machining of the recesses forming the keyway is not critical and in which a competent fit of the key in the keyway is assured.

It is another object of the present invention to provide a keying device which includes two pieces having inclined abutting faces and a pair of faces forming an oblique angle lying opposite thereto and adapted to abut the side surfaces of the keyway with the surfaces of the keyway and the keying device having the same angularity.

It is another object of the present invention to provide a shaft keying device which is relatively easy to install, inexpensive to manufacture, in which machining of the keyway is easy because of its configuration, and which provides a maximum shear strength for the amount of metal removed from the members forming the keyway.

These and other objects of the invention will become more clearly apparent from the following description taken in conjunction with the accompanying drawing.

Referring to the drawing.

Figure 1:
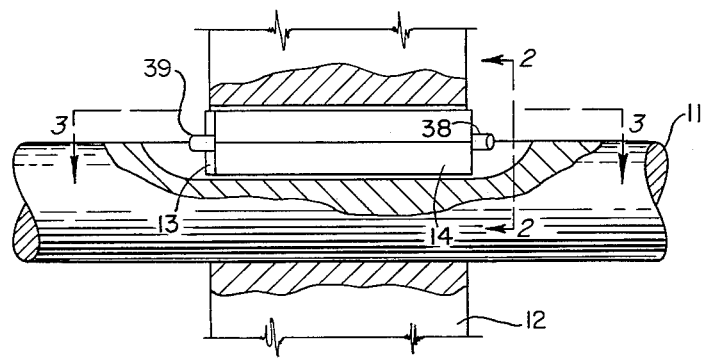
FIGURE 1 is an elevational view, partly in section, showing an element keyed to a shaft.
Figure 2:
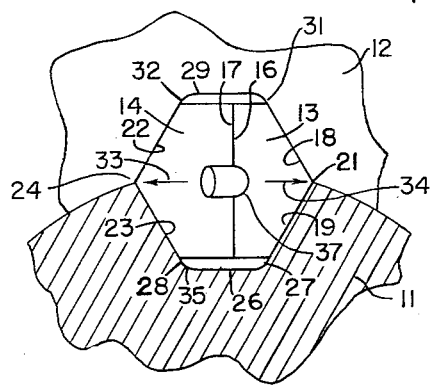
FIGURE 2 is a view taken along the lines 2—2 of FIGURE 1.
Figure 3:
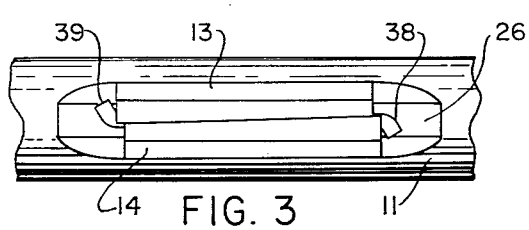
FIGURE 3 is a view taken along the lines 3—3 of FIGURE 1.
Figure 5:
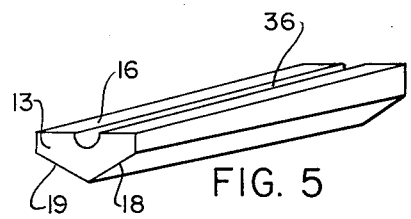
FIGURE 5 shows a perspective view of one piece of a keying device.

Referring to FIGURES 1–3, a shaft 11 is shown having an element 12 keyed thereto. The device 12 may be the hub of a wheel, gear or the like, or may be any other element which it is desired to lock for conjoint movement with the shaft 11. The keying device employed in the instant invention includes two pieces 13 and 14 which have inclined abutting faces 16 and 17, respectively. The piece 13 is provided with a pair of faces 18 and 19 which lie opposite the face 16 and which form a dihedral angle having an edge 21. Similarly, the device 14 includes a pair of faces 22 and 23 forming a dihedral angle with an edge 24.

The shaft 11 is recessed as indicated. The recess includes a bottom 26 and diverging side surfaces 27 and 28. The surfaces 27 and 28 have the same angularity as the abutting surfaces 19 and 23 of the keying pieces. The element 12 is likewise provided with a recess having a bottom surface 29 and side surfaces 31 and 32 which diverge toward the axis. The angularity between the surfaces 31 and 32 is the same as the angularity between the surfaces 18 and 22. The recesses are formed of such depth that the distance between the bottom surfaces is greater than the width of the keying device in the direction of the inclined abutting faces.

It is observed that sharp corners are not present whereby the concentration of stress is minimized. The corners may be rounded if desired, as shown at 35, without interfering with the operation of the key assembly. It should further be pointed out that a minimum amount of metal need be removed for a given shear strength of the keyed assembly in comparison to conventional keyed assemblies.

In operation, the keying device is placed in the keyway, defined by the surfaces 26, 27, 28, 29, 31 and 32, in opposed tapered relationship, with the surfaces 16 and 17 disposed radially. The two pieces are slid longitudinally of one another whereby the two pieces are forced tangentially outwardly as indicated by the arrows 33 and 34 until the surfaces of the key pieces abut the mating surfaces of the keyway.

Figure 4:
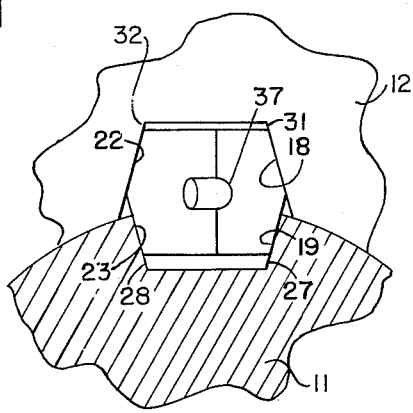
FIGURE 4 illustrates operation of the keying device when the grooves in the shaft and element are not accurately machined.

In FIGURE 2, the recesses are shown with the diverging surfaces having the same spacing at the juncture of the element and shaft. However, as previously described, machining of this type is rather time consuming and expensive, and preferably the device should be capable of use even if the depth of the recesses differs. In the device of the instant invention, the keying device adjusts itself for such differences. Referring particularly to FIGURE 4, the recess formed in the element 12 is considerably deeper than the recess formed in the shaft 11. When the keying device is urged tangentially outwardly, the lower spaced surfaces 19 and 23 abut the surfaces 27 and 28 before the surfaces 18 and 22 abut the surfaces 31 and 32. The action is then to cause a sliding movement upwardly of the keying device until the surfaces 18 and 22 abut the surfaces 31 and 32 at which time the device is seated with all four surfaces in abutting relationship. The importance of having the distance between the bottom of the grooves greater than the width of the keying device in the direction of the inclined plane is apparent. Thus, it is seen that the key is self-seating and provides a competent exact fit even if the depth of the recess in the shaft and element differs. In its final position the keying device is disposed whereby the edge of the dihedral angle is coincident with the edge of a dihedral angle formed by planes which include the diverging surfaces of the shaft and element.

In the embodiment of FIGURE 4, an additional thing should be noted. That is, that the dihedral angle is nearer to 180° than the dihedral angle shown in FIGURE 2.

As a consequence, less radial forces are set up when the keying device is seated. Further, transmission of torque is more tangential than in the device of FIGURE 2, reducing the component of radial force developed by the torque between the parts. In order to better understand this, assume, for example, that the shaft is turning clockwise. Then the forces applied to the abutting faces 23 and 28 will be transmitted through the key to the abutting faces 18 and 31.

Means is preferably provided for causing the two pieces 13 and 14 to slide longitudinally of one another. Such means may, for example, comprise a groove 36 formed in each of the keying pieces and adapted to receive a pin 37. As shown, the groove and pin are circular in section but other configurations might be employed. The pin serves a further purpose in that when the pieces 13 and 14 have been slid relative to one another, the ends 38 and 39 of the pin may be bent as shown in FIGURE 3 to thereby hold the two pieces in position.

Figure 6:
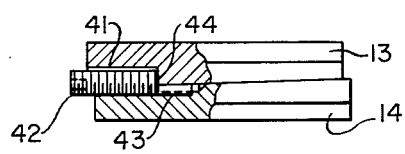
FIGURE 6 shows another embodiment of the invention.
Figure 7:
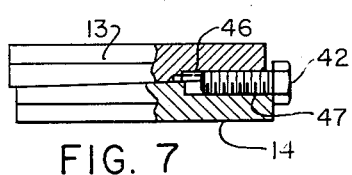
FIGURE 7 shows still another embodiment of the invention.

Means may be provided for urging the pieces longitudinally of one another. Referring to FIGURE 6, for example, the piece 13 includes a groove 41 which accommodates the upper half of the screw 42. The portion 14 includes a threaded groove 43 which threadably receives the screw 42. Thus, by turning the screw 42, it moves inwardly whereby the end 44 abuts the piece 13 and urges the pieces for longitudinal movement relative to one another. The screw performs the further function of guiding the pieces so that they move longitudinally with respect to one another. Referring to FIGURE 7, another means for causing relative longitudinal movement of the pieces is illustrated. In this instance, the member 13 is threaded 46 to threadably receive the screw 42 while the member 14 includes a groove 47 for accommodating the member. Turning movement of the screw 42 will cause the head of the screw to abut the member 14 and urge the same inwardly thereby causing relative movement of the two pieces.

Figure 8:
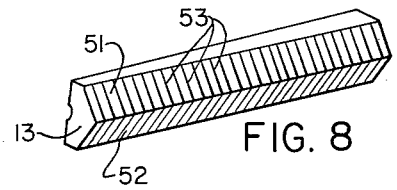
FIGURE 8 shows a further embodiment of the invention.

As is well known, in most instances a set screw or the like is employed to engage the keying device and to prevent the same from riding out of the keyway during operation and to prevent relative axial movement of the shaft and element. The instant invention, because of the forces developed in assembling the keying device in the keyway, may include means for preventing the keying device from moving and relative movement of the shaft and element without resorting to set screws and the like. These means comprise roughening the outer faces of one of said keying device pieces whereby they bite into the abutting surfaces of the shaft and element. Referring particularly to FIGURE 8, the outer surfaces 51 and 52 of one portion of the device are provided with a plurality of grooves 53 having ridges which, in turn, engage the abutting surfaces formed on the shaft and element and prevent movement of the assembled key pieces relative to the keyway. Other means, for example, knurling or the like may be employed for providing a rough surface which competently engages the abutting surfaces formed on the shaft and element.

Thus, it is seen that a keying device having considerable advantages is provided. The torque is transmitted almost entirely tangentially and very little radial stress is set up which would deform the element coupled to the shaft. The keying device is self-seating whereby it forms a competent seat with the sides of the keyway thereby preventing any possible relative movement of the shaft and element. The two-piece keying device is easy to install, even if the element is carried away from the ends of the shaft. Machining is not critical because of the self-seating arrangement and, therefore, a keying in accordance with the invention is relatively inexpensive.

I claim:

1. A keying device for locking a shaft to an element carried by the same comprising two key pieces having abutting faces which are inclined in opposite directions with respect to the longitudinal axis of the device to provide a taper in each key piece, said key pieces each having flat outer faces forming a dihedral angle, a plane bisecting the dihedral angle being perpendicular to a plane which includes the abutting faces, and means included in said key pieces for guiding said key pieces whereby they slide longitudinally of one another.

2. A keying device for locking a shaft to an element carried by the same comprising two key pieces having flat abutting faces inclined in opposite directions with respect to the longitudinal axis of the device to provide a taper in each key piece, each key piece having flat outer faces forming a dihedral angle, a plane bisecting the dihedral angle being perpendicular to a plane which includes the flat abutting faces, and means included in said key pieces for guiding said key pieces whereby they slide longitudinally of one another.

3. A shaft keying device as in claim 2 wherein said last named means comprises registering grooves formed in said abutting faces and a pin disposed in said grooves.

4. A shaft keying device as in claim 2 wherein said last named means comprises a screw threadably engaging one of said keying pieces and slidably accommodated within a groove formed in the other of said keying pieces.

5. A keying device as in claim 2 wherein at least one outer face of one of said pieces is roughened.

6. A keyed assembly comprising a shaft and an element carried thereon, recesses formed in said shaft and said element and adapted to register with one another to define a keyway, the recess formed in said shaft including spaced faces converging towards the axis of the shaft, and the grooves formed in said element including spaced faces diverging toward said axis, a shaft keying device adapted to be operatively disposed in said keyway, said device including two pieces having abutting faces which slope with respect to the longitudinal axis of the keying device to provide a taper in each piece, each key piece having flat outer faces forming a dihedral angle lying opposite the abutting faces of the device, the angularity of said outer faces corresponding to the angularity of the diverging and converging faces forming the keyway, the edge of said dihedral angle being disposed at the edge formed by the planes defining the converging and diverging faces forming the keyway.

7. A keyed assembly comprising a shaft and an element carried thereon, recesses formed in said element and shaft and defining a keyway, the recess formed in said shaft including faces which converge toward the axis of the shaft and the recess formed in said element including faces which diverge toward the axis of the shaft, a keying device comprising two pieces having abutting plane faces which slope with respect to the longitudinal axis of the keying device to provide pieces which are mated in reversely tapered relationship within said keyway, each of said pieces having flat outer faces forming a dihedral angle lying opposite the abutting faces, the angularity of said dihedral angle corresponding to the angularity of the diverging and converging faces of said element and shaft whereby it abuts the faces, and means for guiding said key pieces whereby they slide longitudinally of one another.

8. A keyed assembly as in claim 7 wherein said last named means comprises registering grooves formed in said abutting faces of the key pieces and a pin disposed in said grooves.

9. A keyed assembly as in claim 7 wherein said last named means comprises a screw threadably engaging one of said keying pieces and slidably accommodated within a groove formed in the other of said keying pieces.

10. A keyed assembly as in claim 7 wherein at least one outer face of one of said pieces are roughened.

11. A keying device for locking a shaft to an element carried by the same comprising two key pieces having abutting faces which are inclined in opposite directions with respect to the longitudinal axis of the device to provide oppositely tapered key pieces, said key pieces each having flat outer faces forming a dihedral angle, a plane bisecting the dihedral angle being perpendicular to a plane which includes the abutting faces, the longitudinal center lines of said flat outer faces being parallel to one another, and means included in said key pieces for guiding said key pieces whereby they slide longitudinally of one another.

12. A keyed assembly comprising a shaft and an element carried thereon, recesses formed in said shaft and said element and adapted to register with one another to define a keyway, the recesses formed in said shaft including spaced faces converging towards the axis of the shaft and the grooves formed in said element including spaced faces diverging towards the axis of the shaft, the longitudinal center lines of said faces being parallel to one another, a shaft keying device adapted to be operatively disposed in said keyway, said device including two key pieces having abutting faces which slope in opposite directions with respect to the longitudinal axis of the device to provide oppositely tapered key pieces, each key piece having flat outer faces forming a dihedral angle, a plane bisecting said dihedral angle being perpendicular to a plane including said abutting faces, the angularity of said flat outer faces corresponding to the angularity of the diverging and converging faces of the element and shaft forming the keyway and the longitudinal center lines of said faces being parallel to one another, the edge of said dihedral angle being disposed at the edge formed by the planes defining the converging and diverging faces forming the keyway.

13. A keying device for locking a shaft to an element carried by the same comprising two key pieces having abutting faces which are inclined in opposite directions with respect to the longitudinal axis of the device whereby the key pieces have a reversely tapered relationship, said key pieces each having flat outer faces forming a dihedral angle, a plane bisecting the dihedral angle passing through the longitudinal axis of the device, said flat outer faces being spaced from said abutting faces.

14. A keying device for locking a shaft to an element carried by the same comprising two key pieces having abutting flat faces which are inclined in opposite directions with respect to the longitudinal axis of the device to provide reversely tapered key pieces, said key pieces each having flat outer faces forming a dihedral angle with a plane bisecting the angle being perpendicular to the flat abutting faces, said flat outer faces each being spaced from the flat abutting faces.

References Cited in the file of this patent

UNITED STATES PATENTS

| | | |
|---|---|---|
| 408,835 | Grafton | Aug. 13, 1889 |
| 732,738 | Hammen | July 7, 1903 |
| 1,612,769 | O'Connell | Dec. 28, 1926 |
| 2,497,634 | Stevens | Feb. 14, 1950 |
| 2,519,023 | Coffing | Aug. 15, 1950 |
| 2,623,765 | Coquille | Dec. 30, 1952 |

FOREIGN PATENTS

| | | |
|---|---|---|
| 393,473 | Great Britain | June 8, 1933 |
| 1,009,790 | France | Mar. 12, 1952 |